US008204229B2

(12) United States Patent
Sun et al.

(10) Patent No.: US 8,204,229 B2
(45) Date of Patent: Jun. 19, 2012

(54) METHOD AND SYSTEM FOR DISTRIBUTING KEY OF MEDIA STREAM

(75) Inventors: Kai Sun, Shenzhen (CN); Tao Kong, Shenzhen (CN); Jianghai Gao, Shenzhen (CN); Jing Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 398 days.

(21) Appl. No.: 12/508,025

(22) Filed: Jul. 23, 2009

(65) Prior Publication Data

US 2009/0279705 A1 Nov. 12, 2009

Related U.S. Application Data

(63) Continuation of application No. PCT/CN2008/070148, filed on Jan. 21, 2008.

(30) Foreign Application Priority Data

Jan. 23, 2007 (CN) .......................... 2007 1 0002716

(51) Int. Cl.
*H04L 9/00* (2006.01)
(52) U.S. Cl. ...................................................... 380/277
(58) Field of Classification Search .................. 380/44, 380/247, 279, 272, 273, 286
See application file for complete search history.

(56) References Cited

U.S. PATENT DOCUMENTS

| 7,076,799 | B2 * | 7/2006 | Pirila et al. .......................... 726/5 |
| 7,546,459 | B2 * | 6/2009 | Robles et al. ................. 713/168 |
| 7,590,843 | B1 * | 9/2009 | Khalil et al. .................. 713/171 |
| 7,986,940 | B2 * | 7/2011 | Lee et al. ....................... 455/411 |
| 7,987,366 | B2 * | 7/2011 | Blom et al. .................... 713/171 |
| 8,046,581 | B2 * | 10/2011 | Netanel .......................... 713/168 |
| 2004/0203783 | A1 * | 10/2004 | Wu et al. ........................ 455/436 |
| 2006/0095766 | A1 | 5/2006 | Zhu et al. |

(Continued)

FOREIGN PATENT DOCUMENTS

CN 1681241 10/2005

(Continued)

OTHER PUBLICATIONS

State Intellectual Property Office of the People's Republic of China, Examination Report in Chinese Patent Application No. 2007100027165 (Sep. 18, 2009).

(Continued)

*Primary Examiner* — Beemnet Dada
(74) *Attorney, Agent, or Firm* — Leydig, Voit & Mayer, Ltd.

(57) ABSTRACT

A method and a system for distributing key of media stream are provided. The method comprises: determining, by a security management server, whether a domain to which the calling terminal belongs and a domain to which a called terminal belongs subscribe a key distribution protocol; generating a key based on encryption capability information obtained in a calling process, and distributing the generated key to the calling terminal and the called terminal, if the protocol has been subscribed; generating a key based on encryption capability information obtained in a calling process, and distributing the generated key to the terminal at the same side as the security management server, if the protocol has not been subscribed. By applying the disclosure, the key is generated by the security management server, so that complexity may be reduced for media stream key negotiation to facilitate promotion of media stream encryption service.

16 Claims, 7 Drawing Sheets

U.S. PATENT DOCUMENTS

| | | | |
|---|---|---|---|
| 2006/0200678 A1* | 9/2006 | Yamada et al. | 713/182 |
| 2007/0294186 A1 | 12/2007 | Yan | |
| 2008/0095359 A1* | 4/2008 | Schreyer et al. | 380/44 |
| 2009/0282238 A1* | 11/2009 | Bichot et al. | 713/155 |

FOREIGN PATENT DOCUMENTS

| | | |
|---|---|---|
| CN | 1801698 | 7/2006 |
| CN | 1816213 | 8/2006 |
| WO | WO 01/26322 A2 | 4/2001 |
| WO | WO 2005/027559 A1 | 3/2005 |

OTHER PUBLICATIONS

European Patent Office, Extended European Search Report in European Patent Application No. 08700805.8 (Jun. 25, 2010).

State Intellectual Property Office of the People's Republic of China, English Translation of Written Opinion of the International Searching Authority in International Patent Application No. PCT/CN2008/070148 (May 8, 2008).

Schulzrinne Ne, "RTP: A Transport Protocol for Real-Time Applications," Network Working Group, Memo, Request for Comments: 1889 (Jan. 1996).

Aslam, "Analysis of Real-Time Transport Protocol Security," Information Technology Journal, 3(3): pp. 311-314 (2004).

Baugher, "The Secure Real-Time Transport Protocol (SRTP)," Network Working Group, Memo, Request for Comments: 3711 (Mar. 2004).

\* cited by examiner

METHOD AND SYSTEM FOR DISTRIBUTING KEY OF MEDIA STREAM

CROSS-REFERENCE TO RELATED APPLICATIONS

This application is a continuation of International Patent Application No. PCT/CN2008/070148, filed on Jan. 21, 2008, which claims the benefit of Chinese Patent Application No. 200710002716.5, filed on Jan. 23, 2007, both of which are hereby incorporated by reference in their entireties.

FIELD OF THE DISCLOSURE

Embodiments of the present disclosure relate to media stream encryption, and in particular, relate to method and system for distributing key of media stream.

BACKGROUND

Generally, a media stream, which might be an audio media stream, video media stream or the like, is transmitted based on Real-time Transport Protocol (RTP).

In order to enhance security of the media stream in the progress of transmission, a lot of methods for generating and distributing keys, i.e., key negotiation methods, are proposed at present. Hence, terminals may implement the transmission of the media stream by using the distributed key, and achieve safe transmission of the media stream.

In the prior art, there are two typical methods for the key negotiation methods: Multimedia Internet Key (MIKEY) public key mode and Multimedia Internet Key Diffie-Hellman (MIKEY DH) mode.

The basic principle of MIKEY public key mode lies in that a key and an envelop key are generated and by a calling terminal, the key is encrypted with the envelop key, and the envelop key is then encrypted by use of a public key of a certification of a called terminal, then the encrypted key is transmitted to the called terminal through the MIKEY protocol, the progress of key negotiation is completed when the called terminal obtains the key after decrypting.

In the MIKEY public key mode, to ensure the key negotiating progress being safe and successful, it requires clock synchronization between the calling terminal and the called terminal, and support of a system that has a Public Key Infrastructure (PKI).

The basic principle of MIKEY DH mode lies in that the calling terminal and the called terminal generate DH values, respectively, which are exchanged through the MIKEY protocol, and then generate keys according to the DH values of both sides.

The MIKEY DH mode also requires clock synchronization, and the implementation of the MIKEY DH mode are very complex, with high calculation cost and high requirement on performance of the terminals.

Additionally, in practice, operators need to obtain keys in media stream for safety mechanism to meet requirements of lawful interception. According to prior art, only the terminals participating the interaction are allowed to obtain the keys, which herein might be the calling terminal and the called terminal, or might be a plurality of terminals, and any third party outside the interaction is not allowed to obtain the keys, i.e., it cannot meet the requirements of lawful interception.

SUMMARY

Embodiments of the disclosure provide a method for distributing key of media stream:

when a calling terminal initiates a call, the method for distributing key of media stream includes:

A. determining, by a security management server, based on a calling request message, whether a domain to which the calling terminal belongs and a domain to which a called terminal belongs subscribe a key distribution protocol; executing block B and then quitting the process if the protocol has been subscribed; executing block C if the protocol has not been subscribed;

B. generating, by the security management server, a key based on encryption capability information obtained in a calling process, and distributing the same generated key to the calling terminal and the called terminal;

C. generating, by the security management server, a key based on encryption capability information obtained in a calling process, and distributing the generated key to the terminal at the same side as the security management server itself is located.

Additionally, embodiments of the disclosure further provide:

a system for distributing key of media stream, at least includes a calling terminal and a called terminal, the system further includes a calling terminal, a called terminal and a security management server, wherein the security management server is configured to determine an encryption manner based on subscription status of a domain to which the calling terminal belongs and a domain to which the called terminal belongs, generate a key based on encryption capability information obtained in a calling process, and transmit the generated key to the calling terminal or the called terminal.

DETAILED DESCRIPTION

The embodiments of the disclosure are described in detail in conjunction with the accompany drawings.

Embodiments of the disclosure may determine a manner for encrypting based on the circumstance about a key distribution protocol subscribed by a domain to which a calling terminal belongs and a domain to which a called terminal belongs. If the protocol is subscribed, a corresponding key is obtained in an end-to-end encryption negotiation manner; and if the protocol is not subscribed, the corresponding key is obtained in a segmented encryption manner.

According to cases that the calling side enables an encryption service, the method for distributing media stream keys may be divided into two types: one is the type that the calling side regards the encryption service as a basic service; the other is the type that the calling side regards the encryption service as a value-added service.

Figure 1:
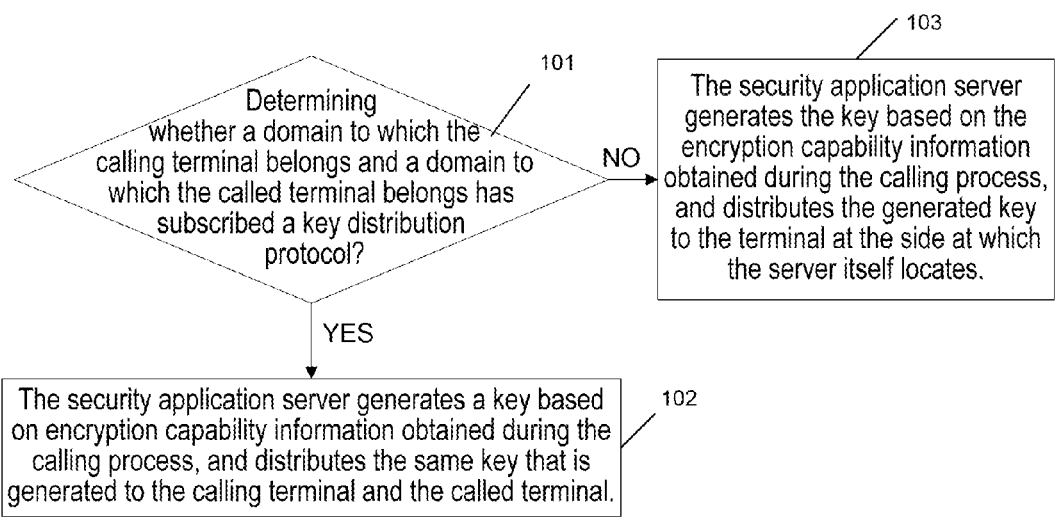
FIG. 1 is a flow chart according to embodiment one of the present disclosure.

As to the case that the calling side regards the encryption service as a basic service, the keys may be generated by a security application server, whether the end-to-end encryption negotiation manner is used or the segmented encryption manner is used, as shown in FIG. 1 in a method embodiment one.

That is to say, the method embodiment one may set a security application server for generating keys in advance. When the calling terminal initiates a call, the method that a terminal device obtains a media stream key includes the following blocks:

Block 101: The security application server determines whether a key distribution protocol has been subscribed by the domain to which the calling terminal belongs and the domain to which the called terminal belongs based on a calling request message; if yes, Block 102 is executed and then this flow ends; if no, Block 103 is executed.

The calling request message may carry a user identifier, based on which the security application server is able to query related information of the key distribution protocol subscribed by the operator of the calling terminal and the operator of the called terminal. For example, if the protocol has been subscribed, the related information of the subscribed key distribution protocol may be set to be "subscribed" in advance; or else, it may be set to be "unsubscribed".

Block 102: The security application server generates a key based on encryption capability information obtained during the calling process, and distributes the same key that is generated to the calling terminal and the called terminal.

This block is to obtain corresponding key in the end-to-end encryption negotiation manner, i.e., the calling terminal and the called terminal negotiate to generate the encryption capability information of the key during the calling process, and the security application server generates the key based on the encryption capability information decided by the negotiation, and then the generated key is transmitted to the calling terminal and the called terminal, respectively.

When this embodiment is implemented, the Block 102 may specifically comprises:

B1. The called terminal receives the calling request message that carries the encryption capability information of the calling terminal from the calling terminal;

B2. The called terminal determines the encryption capability information of the key to be generated from the encryption capability information of the calling terminal and itself, and then returns a calling response message that carries the encryption capability information of the key to be generated;

B3. The security application server at the calling side generates the key based on the encryption capability information in the calling response message, and transmits the generated key to the calling terminal;

B4. The calling terminal transmits a calling related message to the called terminal, and in the progress of transmitting the calling related message, the security application server at the calling side transmits the calling related message that adds the generated key into the called terminal.

By using said end-to-end encryption negotiation manner, both of the calling terminal and the called terminal may acquire the key, and in following transmission progress, the acquired key may be used for encryption transmission of media stream.

Block 103: The security application server generates the key based on the encryption capability information obtained during the calling process, and distributes the generated key to the terminal at the side at which the server itself is located.

This block is to obtain corresponding key in the segmented encryption manner, i.e., the calling side and the called side generate their keys, respectively. If a security management server is the security application server at the calling side and the security application server at the called side, the method for implementing may be:

C1. The security application server at the calling side records the encryption capability information of the calling terminal from the calling request message of the calling terminal;

C2. Upon receipt of the calling request, the called terminal returns a calling response message that carries the encryption capability information of the called terminal itself, which is obtained and recorded by the security application server at the called side from the calling response message;

C3. The security application server at the calling side transmits the key generated from the encryption capability information of the calling terminal to the calling terminal, and sends to media stream bearing devices at the calling side;

C4. The security application server at the called side transmits the key generated from the encryption capability information of the called terminal to the called terminal, and sends the generated key to media stream bearing devices at the called side.

In the segmented encryption negotiation manner, all of the calling terminal, the media stream bearing devices at the calling side, the media stream bearing devices at the called side and the called terminal obtain the key. In subsequent process of media stream transmission, an encrypted media stream is transferred between the calling terminal and the media stream bearing devices at the calling side, an encrypted media stream is transferred between the called terminal and the media stream bearing devices at the called side, but an unencrypted stream is transferred between the media stream bearing devices at calling and the media stream bearing devices at the called side.

The method for obtaining corresponding keys in the segmented encryption manner described herein is in the circumstance that the called side regards the encryption service as a basic service. If the called side regards the encryption service as a value-added service, the method, before the called terminal receives the calling request, may further comprise:

querying, by the security application server at the called side, preset encryption service subscription information to determine whether the called terminal has subscribed based on the user identifier; if so, then the above Blocks C2~C4 are executed; or else, Block x is executed.

The Block X may comprise: transmitting, by the security application server at the calling side, the key generated from the encryption capability information of the calling terminal to the calling terminal, and sending it to the media stream bearing devices at the calling side.

Here, in Block X, as only the calling terminal and the media stream bearing devices at the calling side obtain the key, the calling side encrypts the media stream in subsequent process of media stream transmission but the called side transfers the media stream in plaintext.

The solution of this embodiment shall avoid clock synchronization, Public Key Infrastructure (PKI) support, certificate management and the like, reduce complexity for generating keys and facilitate extension of media stream encryption service, under the precondition that security of links are ensured.

It is described above a circumstance that the calling side regards encryption as a basic service. If the calling side regards the encryption as a value-added service while the called side regards encryption service as a basic service, the method, before the subscription of the key distribution protocol is checked in Block 101, may further comprise:

querying, by the security application server at the calling side, preset encryption service subscription information to determine whether the calling terminal has subscribed based on the user identifier; if so, then the execution of Block 101 is preceded; or else Block Y is executed.

The Block Y may comprise:

y1. receiving, by the called terminal, a calling request message that carries the encryption capability information of the calling terminal from the calling terminal;

y2. determining, by the called terminal, encryption capability information of a key to be generated from the encryption capability information of the calling terminal and the encryption capability information of the called terminal itself, and returning a calling response message that carries the encryption capability information of the key to be generated;

y3. generating, by the security application server at the called side, the key based on the encryption capability information in the calling response message, and transmitting the generated key to the calling terminal;

y4. returning, by the calling terminal, a calling related message to the called terminal, and transmitting, by the security application server at the called side, the generated key to the called terminal through the calling related message.

Herein, as both of the calling terminal and the called terminal obtain the key, the obtained key may be used for encrypted transmission of media stream in the entire transmission process. Contrary to the case that the calling side regards the encryption service as a basic service, the key utilized by the end-to-end encryption described herein is generated by the security application server at the called side.

Surely, before the called terminal receives the calling response message as described in block y1, the security application server at the calling side may determine that the domain to which the calling terminal belongs and the domain to which the called terminal belongs subscribe a key distribution protocol based on the calling request message firstly, and then the calling request message is transmitted to the called terminal.

If the called side regards the encryption service as a value-added service, the method, before the called terminal receives the calling request message as described in Block y1, may further comprise: querying, by the security application server at the called side, preset encryption service subscription information to determine that the called terminal has subscribed based on the user identifier. If it is determined that the called terminal does not subscribe, i.e., neither of the calling side and the called side supports the encryption service, then the calling terminal and the called terminal will not obtain the key, and will implement a calling flow in accordance with the prior art.

Whether the calling side regards the encryption service as a basic service or a value-added service, the calling request message discussed above is a calling request message that carries encryption capability information, i.e., the calling terminal requires encryption, voluntarily.

Alternatively, in practice, the calling terminal may fail to support encryption or do not request encryption, and the transmitted calling request message may be a calling request message that does not carry encryption capability information. In this case, it may determine whether the calling request message carries the encryption capability information prior to the security application server at the calling side querying the encryption service subscription information; if yes, then it continues, and if not, then Block Z is executed. The Block Z may comprise:

z1. returning, by the called terminal, a calling response message that carries encryption capability information upon receipt of the calling request message;

z2. obtaining and recording, by the security application server at the called side, encryption capability information of the called terminal from the calling response message;

z3. transmitting, by the calling terminal, a calling related message to the called terminal upon receipt of the calling response message, in which the security application server at the called side transmits a key generated from the encryption capability information to the called terminal through the calling related message, and sends it to the media stream bearing devices at the called side.

As only the called terminal and the media stream bearing devices at the called side obtain the key, the called side encrypts media stream with the obtained key in subsequent process of the media stream transmission, but the calling side transfers the media stream in plaintext.

Herein, since the calling request transmitted by the calling terminal does not include encryption capability information, the security application server at the called side may add pre-stored encryption capability information into the calling request message before the called terminal receives the calling request message. As such, prior to the called terminal returning a calling response message, the called terminal may determine encryption capability information of a key to be generated from the encryption capability information in the calling request message and the encryption capability information of the called terminal itself, and add the determined encryption capability information of the key to be generated into the calling response message.

Besides, the above Block Z relates to the case that the called side regards the encryption service as a basic service. If the encryption service is regarded as a value-added service, the security application server at the called side may query preset encryption service subscription information firstly, and determine that the called terminal has subscribed based on the user identifier before the called terminal receives the calling request message. Of course, if it is determined that the called terminal has not subscribed, it may directly execute existing calling flow and neither of the calling terminal and the called terminal may acquire the key.

In practice, the messages interacted between the calling terminal and the called terminal in the calling flow may include a status identifier for obtaining key. When the calling/called terminal has not obtained the key, then the status identifier in the messages transmitted to the called/calling terminal is set to be a key-not-obtained identifier; or else, it is set to be a key-obtained identifier. Thanks to the status identifier for obtaining key, either of the two sides may notify to each other the circumstance regarding the acquisition of the key by the side itself.

In practice, the security application server in this embodiment may be replaced with any of various types of servers or functional modules in a certain entity, so long as it may generate a key based on encryption capability information of a terminal and distribute the key to terminals. They all may be called security management servers, regardless of the type thereof. In addition, the security application server in this embodiment may include various types, such as Application Server of IP multimedia sub-system (IMS-AS), functional module in Calling Session Control Function (CSCF) entity, or a third party server, etc.

If the Security application server is IMS-AS and the calling request message is transmitted by the calling terminal to the called terminal via the IMS-AS at the calling side and the IMS-AS at the called side, the method for routing the calling request message may concretely include:

the calling terminal transmits the calling request message to a S-CSCF at the calling side; the S-CSCF at the calling side filters the received calling request message in accordance with pre-obtained filtering rules, and forwards the calling request message that carries encryption capability information to the security application server at the calling side; the security application server at the calling side transmits the calling request message to a S-CSCF at the called side via the S-CSCF at the calling side; the S-CSCF at the called side filters the received calling request message in accordance with the pre-obtained filtering rules, and forwards the calling request message that carries encryption capability information to the security application server at the called side; the security application server at the called side then transmits the calling request message to the called terminal.

For better explanation of the solution of embodiments of the disclosure, method embodiments 2 to 6 are described in detail.

Embodiment 2

In this embodiment, both of the calling side and the called side regard the encryption service as a basic service, and an operator to which the calling side belongs and an operator to which the called side belongs subscribe a key distribution protocol; the security application server is an IMS-AS that is divided to be IMS-AS at the calling side and IMS-AS at the called side, and the key is generated by the IMS-AS at the calling side.

Figure 2:
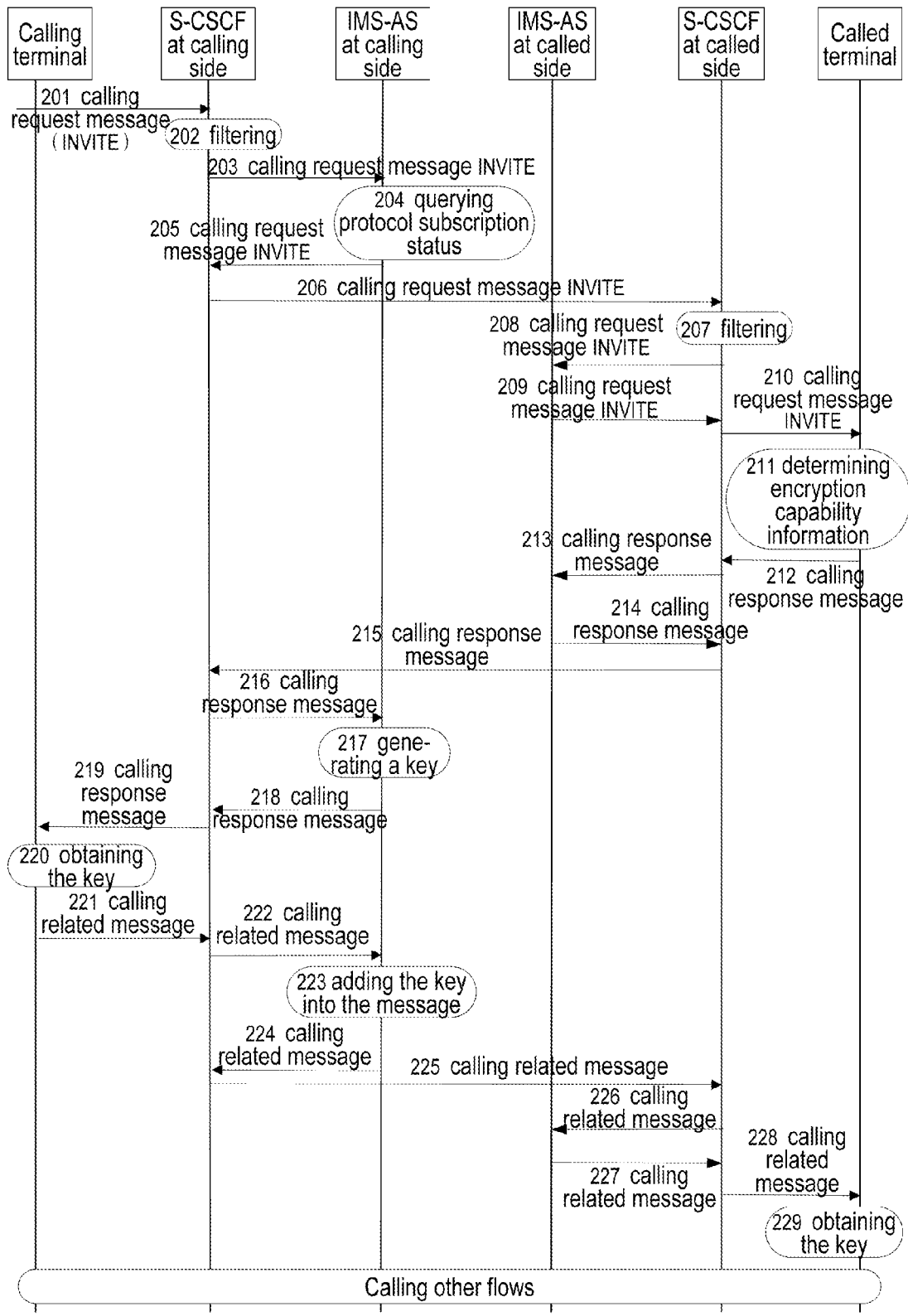
FIG. 2 is a schematic diagram of the message flow according to embodiment two of the present disclosure.

FIG. 2 is schematic diagram of a message flow according to method embodiment 2. As illustrated by FIG. 2, the method embodiment 2 may include the following blocks:

Block 201: A calling terminal initiates to call by transmitting a calling request message to the S-CSCF at the calling side.

The calling request message herein is the INVITE message in Session Initiation Protocol (SIP). Four methods may be adopted to load the encryption capability information of the calling terminal into the INVITE message: the first method is to load into Session Description Protocol (SDP) of the INVITE message; the second method is to load into SIP calling attribute Accept-contact header domain in the INVITE message; the third method is to load into extension negotiation domain of the SIP in the INVITE message; and the fourth method is to load into fields defined by RFC 4568 standard in the INVITE message.

The encryption capability information herein may also be referred to as an encryption capability statement, which might comprise information such as a support for Secure Real-time Transport Protocol (SRTP), a support for encryption algorithm, a support for key length, etc.

As to the fourth method for loading, the encryption capability information may be loaded into "a" field of the SDP. Besides, the calling request message may further carry with security preconditions in relation to encryption, which may contain an identifier for specifying an encryption manner. In this case, the format of the fourth method for loading might be:

m=video 51372 RTP/SAVP 31
a=curr:sec e2e none
a=des:sec mandatory e2e sendrecv
a=crypto:1 AES_CM_128_HMAC_SHA1_80
inline:
a=crypto:2 AES_CM_128_HMAC_SHA1_32
inline:
m=audio 49170 RTP/SAVP 0
a=curr:sec e2e none
a=des:sec mandatory e2e sendrecv
a=crypto:1 AES_CM_128_HMAC_SHA1_32
inline:
a=crypto:2 AES_CM_128_HMAC_SHA1_80
inline:

Herein, there are two encryption capability statements and security preconditions about video stream and audio stream. Taking those about video stream as an example, "a=curr:sec e2e none" and "a=des:sec mandatory e2e sendrecv" are security preconditions, in order to represent the media stream encryption of two aspects, i.e., mandatory end-to-end receiving and transmitting, that the calling terminal desires, and indicate that the calling terminal has not implemented the preconditions in relation to the media stream encryption. Additionally, the "inline" field is configured to carry a key. If the calling terminal has not obtained a key, the "inline" field shall be null; if the network side generates a key that is required to be transmitted to the calling terminal, the generated key may be carried in the "inline" filed in the message to be returned to the calling terminal, which then may obtain the key from the "inline" field.

In practice, due to the case where the called terminal might not support encryption, the calling request message may have a statement that encryption information is not included as well, to ensure a successful call, i.e., the above statement is added with two following statements:

m=video 51372 RTP/AVP 31
m=audio 49170 RTP/AVP 0

As such, if the opponent does not support encryption, the calling process may be completed based on the prior art.

Block 202~Block 203: The S-CSCF at the calling side filters the received calling request message in accordance with pre-obtained filtering rules, and forwards the calling request message that carries encryption capability information to the IMS-AS at the calling side.

In this embodiment, since the calling side regards the encryption service as a basic service, the filtering rules herein might be default filtering rules provided for users in advance, the format of which may be illustrated as Table 1:

TABLE 1

| Priority | |
|---|---|
| Trigger point | |
| SIP method | INVITE |
| SIP message header | Require : precondition |
| | a=crypto |
| Description of Session | m=RTP /SAVP |
| Session situation | Originating |
| Address | Address of IMS-AS at the calling side |

As such, the calling request message may be triggered to the IMS-AS at the calling side for processing, and in a subsequent calling process, the IMS-AS at the calling side is located in a signaling link of the call, i.e., all messages related to the call will pass through the IMS-AS at the calling side.

Block 204~Block 206: The IMS-AS at the calling side determines that the key distribution protocol has been subscribed by the domain to which the calling terminal belongs and the domain to which the called terminal belongs, and transmits the calling request message to the S-CSCF at the called side via the S-CSCF at the calling side.

If the calling request message carries a security precondition that contains an end-to-end encryption identifier, the IMS-AS at the calling side may then determine that this is a calling request message that requires end-to-end encryption based on the calling request. In addition, since the key is generated by the IMS-AS at the calling side in this embodiment, the IMS-AS at the calling side may add an identifier indicating that the key is generated at the calling side into the calling request message to notify the IMS-AS at the called side that the key is generated. Thereafter, the security application server at the called side may determine the encryption manner to be end-to-end encryption based on the calling request message, and determine that the key is generated by the security application server at the calling side.

Block 207~Block 210: The S-CSCF at the called side filters the received calling request message in accordance with the pre-obtained filtering rules, and forwards to the IMS-AS at the called side the calling request message that carries encryption capability information, which then is forwarded to the called terminal via the S-CSCF at the called side.

Similar to the calling side, in this embodiment, the called side regards the encryption service as a basic service. The filtering rules herein might be default filtering rules provided for users in advance, the format of which is illustrated as Table 2:

TABLE 2

| Priority | |
|---|---|
| Trigger point | |
| SIP method | INVITE |
| SIP message header | Require : precondition |
| | a=crypto |
| Description of Session | m=RTP /SAVP |
| Session situation | Terminating |
| Address | Address of IMS-AS at the called side |

As such, the calling request message may be triggered to the IMS-AS at the called side for processing, and in subsequent calling process, the IMS-AS at the called side is located in a signaling link of the call, i.e., all messages related to the call will pass through the IMS-AS at the called side.

If the calling request message includes identifiers for encryption manner and the side that generates the key, the S-CSCF at the called side may determine from the calling request message that the call requires an end-to-end encryption manner and the key is generated by the IMS-AS at the calling side.

Block 211~Block 216: The called terminal determines encryption capability information of the generated key based on the encryption capability information of the calling terminal and the called terminal itself in the calling request message, and then returns to the IMS-AS at the calling side a calling response message that carries the encryption capability information of the generated key.

In this embodiment, the called terminal may return:
m=video 31337 RTP/SAVP 31
a=curr:sec e2e none
a=des:sec mandatory e2e sendrecv
a=conf:sec e2e sendrecv
a=crypto:1        AES_CM_128_HMAC_SHA1_80 CALLER-ALLOC-KEY
inline:
m=audio 31399 RTP/SAVP 0
a=curr:sec e2e none
a=des:sec mandatory e2e sendrecv
a=conf:sec e2e sendrecv
a=crypto:1        AES_CM_128_HMAC_SHA1_32 CALLER-ALLOC-KEY
inline:
In the case that the calling request message includes two kinds of calling request (with or without the encryption capability information), if the called terminal does not support the encryption, a 4xx error message is returned, or a calling response message is returned for the calling request without the encryption capability information, i.e. implementing a normal call.

Block 217~Block 220: The IMS-AS at the calling side generates a key based on the encryption capability information in the calling response message, and returns the generated key to the calling terminal.

If the message comprises a security precondition, after the calling terminal obtains the key from the calling response message, the security precondition may be modified, while an acknowledge information is transmitted to the called terminal. For example:
m=video 51372 RTP/SAVP 31
a=curr:sec e2e sendrecv
a=des:sec mandatory e2e sendrecv
a=crypto:1        AES_CM_128_HMAC_SHA1_80 CALLER-ALLOC-KEY
inline:
m=audio 49170 RTP/SAVP 0
a=curr:sec e2e sendrecv
a=des:sec mandatory e2e sendrecv
a=crypto:1        AES_CM_128_HMAC_SHA1_32 CALLER-ALLOC-KEY
inline:
The bold portions in the second line and the seventh line are modified preconditions.

Block 221~Block 229: The calling terminal transmits a calling related message to the called terminal, and in the progress of the transmitting, the IMS-AS at the calling side transmits the calling related message that adds the generated key into the called terminal.

The calling related message herein may be an acknowledge message (PRACK) or an update information message (UPDATE) or the like.

In this embodiment, the IMS-AS at the calling side may be added into the message, i.e. being loaded in the inline field, in the following manners. For example:
m=video 51372 RTP/SAVP 31
a=curr:sec e2e sendrecv
a=des:sec mandatory e2e sendrecv
a=crypto:1        AES_CM_128_HMAC_SHA1_80 CALLER-ALLOC-KEY
inline: d0RmdmcmVCspeEc3QGZiNWpVLFJhQX1cfHAwJSoj
m=audio 49170 RTP/SAVP 0
a=curr:sec e2e sendrecv
a=des:sec mandatory e2e sendrecv
a=conf:sec e2e sendrecv
a=crypto:1        AES_CM_128_HMAC_SHA1_32 CALLER-ALLOC-KEY
inline:        NzB4d1BINUAvLEw6UzF3WSJ+PSdFcGdUJShpX1Zj
The bold portions in the fifth line and the eleventh line are the key being carried.

Of course, other processes of the call shall be completed between the calling terminal and the called terminal. For example, upon receipt of the PRACK message, the called terminal needs to return a 200 OK message to the calling terminal. The specific calling flow may refer to the prior art, which is omitted here for brevity.

The security application server in this embodiment is explained by use of IMS-AS as an example. In practice, the security application server may be a functional module in the S-CSCF or a third party server as well. In this circumstance, the signaling link of the call might be identical to the signaling link in the prior art, and the method for implementing endto-end encryption is similar to the embodiment, the difference therebetween lies in that if it is a functional module in the S-CSCF, all of the blocks of checking whether the domain to which the calling terminal belongs and the domain to which the called terminal belongs subscribe the protocol, adding the identifier indicating that the key is generated at the calling side into the calling request message, generating the key and so on may be completed by the S-CSCF at the calling side directly; if it is a third party server, the third party server is only responsible for generating the key, but the blocks of checking whether the domain to which the calling terminal belongs and the domain to which the called terminal belongs subscribe the protocol, adding the identifier indicating that the key is generated at the calling side into the calling request message and so on may be completed by the S-CSCF; or all of the blocks of checking whether the domain to which the calling terminal belongs and the domain to which the called terminal belongs subscribe the protocol, adding the identifier indicating that the key is generated at the calling side into the calling request message, generating the key and so on may be completed by the third party server. Anyway, all of the methods require an interactive protocol being determined between the S-CSCF and the third party server, which may be determined by the user utilizing the solution of the embodiments of the disclosure himself.

Embodiment 3

In this embodiment, both of the calling side and the called side regard the encryption service as a basic service, but there is no key distribution protocol subscribed between the domain to which the calling terminal belongs and the domain to which the called terminal belongs. In this embodiment, the security application server is a functional module in the S-CSCF, i.e., a security application unit. But for better explanation, the S-CSCF and the security application unit will be described separately.

Figure 3:
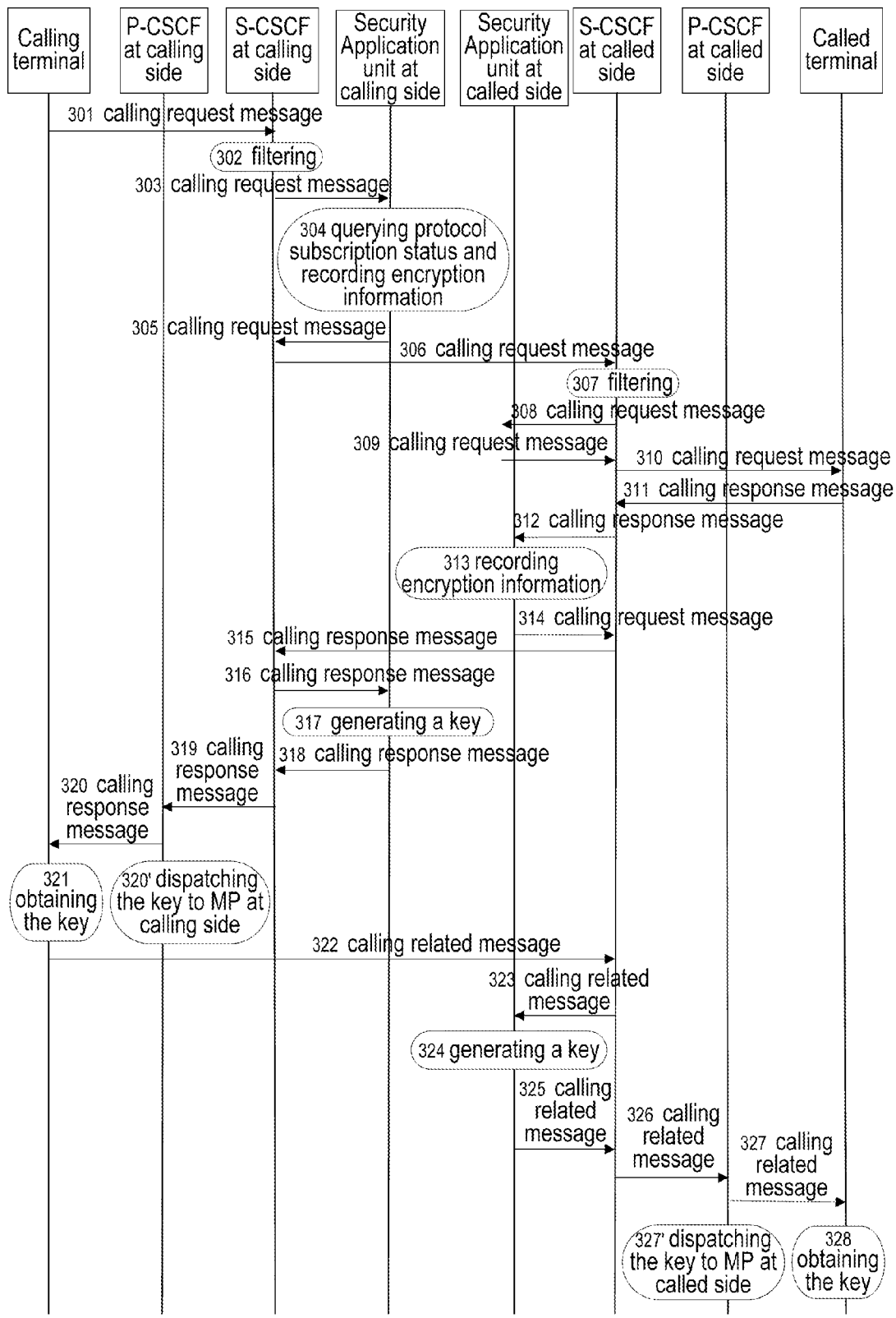
FIG. 3 is a schematic diagram of the message flow according to embodiment three of the present disclosure.

FIG. 3 is a schematic diagram of the message flow according to the method embodiment 3. As shown in FIG. 3, the method embodiment 3 includes the following blocks:

Block 301~Block 303 are similar to Block 201~Block 203 in Embodiment 1, and the difference therebetween only lies in that the S-CSCF at the calling side transmits the calling request message to the security application unit of the S-CSCF itself for processing.

Block 304~Block 306: The security application unit at the calling side determines that the domain to which the calling terminal belongs and the domain to which the called terminal belongs do not subscribe a key distribution protocol, and transmits the calling request message to the S-CSCF at the called side after the encryption capability information of the calling terminal in the calling request message is recorded.

Similar to the Embodiment 2, if the calling request message carries a security precondition that contains an end-to-end encryption identifier, the security application unit at the calling side may then determine that this is a calling request message that requires end-to-end encryption based on the calling request. But, as the domain to which the calling terminal belongs and the domain to which the called terminal belongs do not subscribe a key distribution protocol, the security application unit at the calling side may determine to adopt a segmented encryption manner. In order to inform the called side of the encryption manner, the security application unit at the calling side may modify the end-to-end encryption identifier to be a segmented encryption identifier. Thereafter, the called side may determine that the calling request requires a segmented encryption based on the identifier.

If it is not required for the user of the called terminal to get the knowledge that the encryption manner has been modified, the called side may transmit to the called terminal after the segmented encryption identifier is modified to be the end-to-end encryption identifier. Of course, in this case, the end-to-end encryption identifier shall be re-modified to be the segmented encryption identifier when the called terminal returns a message.

In practice, when the segmented encryption manner is determined, if the terminal is capable of parsing symbols, the user may be prompted that the call security of this session is not fully guaranteed.

In addition, as the segmented encryption is performed, both of the calling side and the called side are not needed to know the encryption capability information of each other, so that the information in relation to encryption in the calling request message may be deleted when it is determined to utilize the segmented encryption.

If it is not required to report the calling terminal which encryption manner is adopted at network side, a pre-modified encryption manner may be restored to be the end-to-end encryption when a message is returned to the calling terminal.

Block 307~Block 310 are similar to the Block 207~Block 210 in the Embodiment 2, the difference there between only lies in that the S-CSCF at the called side transmits the calling request message to the security application unit of the S-CSCF itself for processing.

Block 311~Block 314: Upon receipt of the calling request message, the called terminal returns a calling response message that carries the encryption capability information of the called terminal itself, and the security application server at the called side obtains and records the encryption capability information of the called terminal from the calling response message.

Block 315~Block 321: The S-CSCF at the called side continues to transmit the calling response message to the calling terminal. During the transmission, the security application unit at the calling side transmits the calling response message that carries a key generated from the encryption capability information of the calling terminal to the calling terminal, and sends to media stream bearing devices at the calling side.

In this embodiment, in Block 317, the security application unit at the calling side generates the key based on the encryption capability information of the calling terminal recorded in Block 304. But, in practice, the key may be generated at any time, not always at Block 317, as long as the security application unit at calling terminal may obtain the encryption capability information of the calling terminal.

In addition, in this embodiment, the media stream bearing device may be Media Proxy (MP). When the security application unit at the calling side needs to send the generated key to the MP, this method includes:

the security application unit at the calling side transmits the calling response message that carries the key to a P-CSCF at the calling side via the S-CSCF at the calling side, and the P-CSCF at the calling side transmits the message that carries the key to the MP at the calling side. In practice, when the P-CSCF at the calling side needs to send the key to the MP at the calling side, the key may be sent to the MP at the calling side via a Resource and Access Control Sub-System (RACS).

For example, the P-CSCF at the calling side initiates a resource reservation process, in which the P-CSCF at the calling side transmits the generated key to the RACS at the calling side, and then the RACS at the calling side transmits the key to the MP at the calling side. Of course, the P-CSCF at the calling side may transmit the key to the MP at the calling side via an independent process for sending the key, so long as the key may be transmitted to the MP at the calling side.

Block 322~Block 328: The calling terminal transmits a calling related message to the called terminal. During the transmission of the calling related message, the security application unit at the called side transmits the calling related message that carries the key generated from the encryption capability information of the called terminal to the called terminal, and sends to media stream bearing devices at the called side.

Here, the calling related message may be any message transmitted from the calling terminal to the called terminal, such as a UPDATE message, a PRACK message, etc.

Similar to the calling side generating the key, in this embodiment, the security application unit at the called side generates, in Block 323, the key based on the encryption capability information of the called terminal obtained at Block 313. In practice, the key may be generated at any time thereafter, not always at Block 324, as long as the security application unit at the called side may obtain the encryption capability information of the called terminal.

The method for sending the key to the media stream bearing devices at the called side by the called side is similar to the method for sending the key to the media stream bearing devices at the calling side by the calling side, which is hence omitted for brevity.

Moreover, this embodiment was described as an example where the security application unit is a functional unit in the S-CSCF. If it is a functional unit in the P-CSCF, the method thereof would be similar to that of this embodiment, except that after the key is generated in the P-CSCF, the P-CSCF transmits the key to the terminal and sends to the media stream bearing devices directly. Here, the specific flow will not be described in detail.

Embodiment 4

In method embodiment 4, the calling side regards the encryption service as a basic service, the called side regards the encryption as a value-added service, the called terminal does not subscribe the encryption service, there is no key distribution protocol subscribed between the domain to which the calling terminal belongs and the domain to which the called terminal belongs. In this embodiment, the security application server is IMS-AS.

Figure 4:
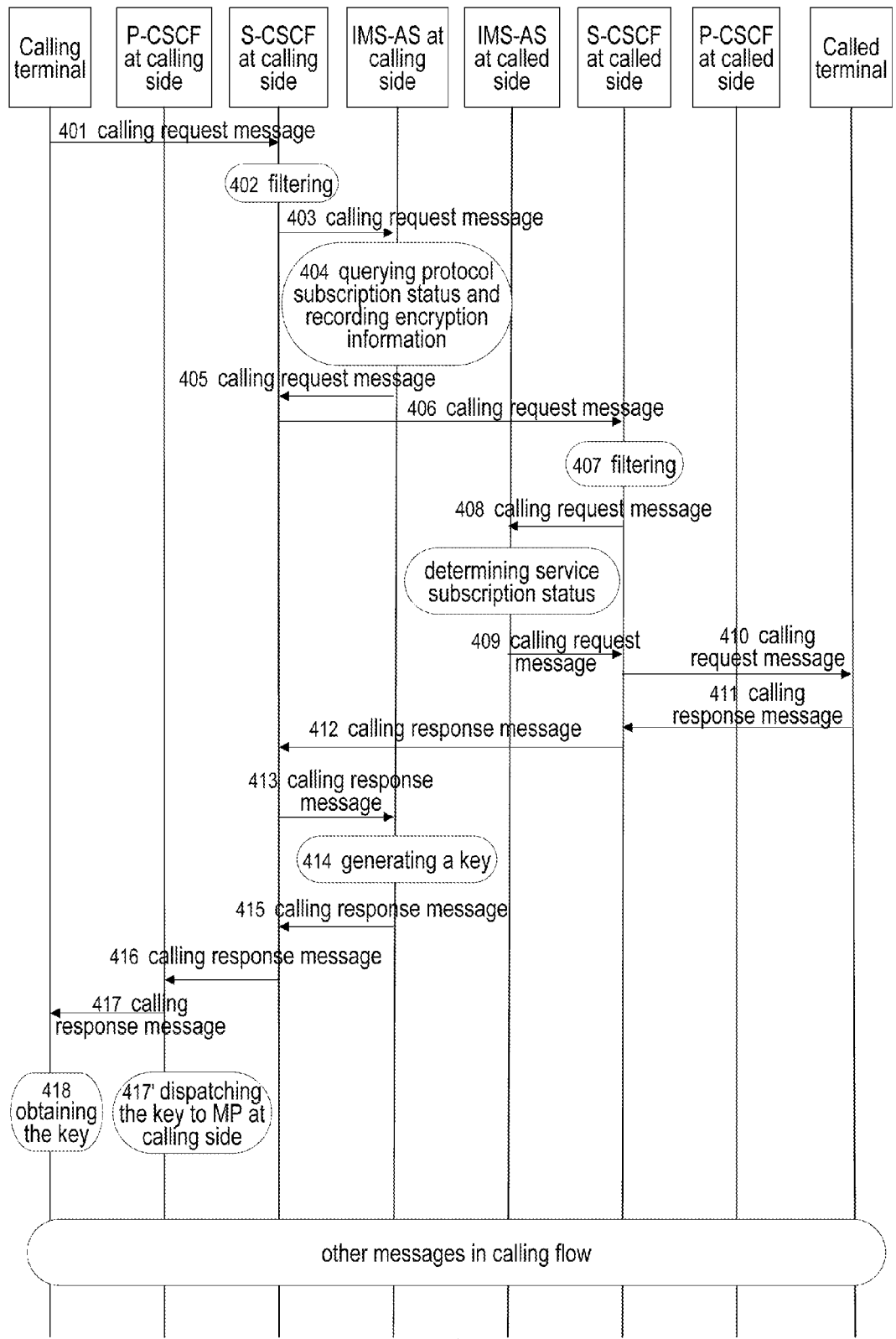
FIG. 4 is a schematic diagram of the message flow according to embodiment four of the present disclosure.

FIG. 4 is a schematic diagram of the message flow according to the method embodiment 4. As shown in FIG. 4, the method embodiment 4 may include the following blocks:

Block 401~Block 410 are similar to Block 301~Block 310 in Embodiment 3, and the differences there between lie in that upon receipt of the calling request message, the IMS-AS at the called side queries the preset encryption service subscription information, and determines that the called terminal does not subscribe the encryption service based on the user identifier.

As the called terminal does not subscribe the encryption service, the called side does not generate a key for the called terminal. In this case, the IMS-AS at the called side may delete the IMS-AS itself from the signaling link, so that messages in subsequent calling process no longer passes through the IMS-AS at the called side; or the IMS-AS at the called side may not delete the IMS-AS itself from the signaling link, but functions to transfer messages instead.

Block 411~Block 417: The called terminal returns a calling response message to the calling terminal, and in the process of returning, the security application server at the calling side transmits to the calling terminal a key generated on the basis of the encryption capability information of the calling terminal, and sends to media stream bearing devices at the calling side.

Hereafter, the calling terminal and the called terminal are required to complete other parts of the calling flow, but the called side neither generates a key, nor transmits the key to the called terminal and media stream bearing devices at the called side. The calling flow in the called side might be identical to the prior art. As to how the calling side sends the key to media stream bearing devices, it is the same as in embodiment 3, so that related descriptions are omitted for brevity.

After the calling flow terminates, only the calling terminal and the media stream bearing devices at the calling side obtain the key. The media stream is transmitted in encryption at the calling terminal and the media stream bearing devices at the calling side, but in plaintext at the called side.

Method Embodiment 5

In the method embodiment 5, both of the calling side and the called side regard the encryption service as a value-added service, the calling terminal does not subscribe the encryption service, but the called terminal does; and a key distribution protocol has been subscribed between the domain to which the calling terminal belongs and the domain to which the called terminal belongs.

Figure 5:
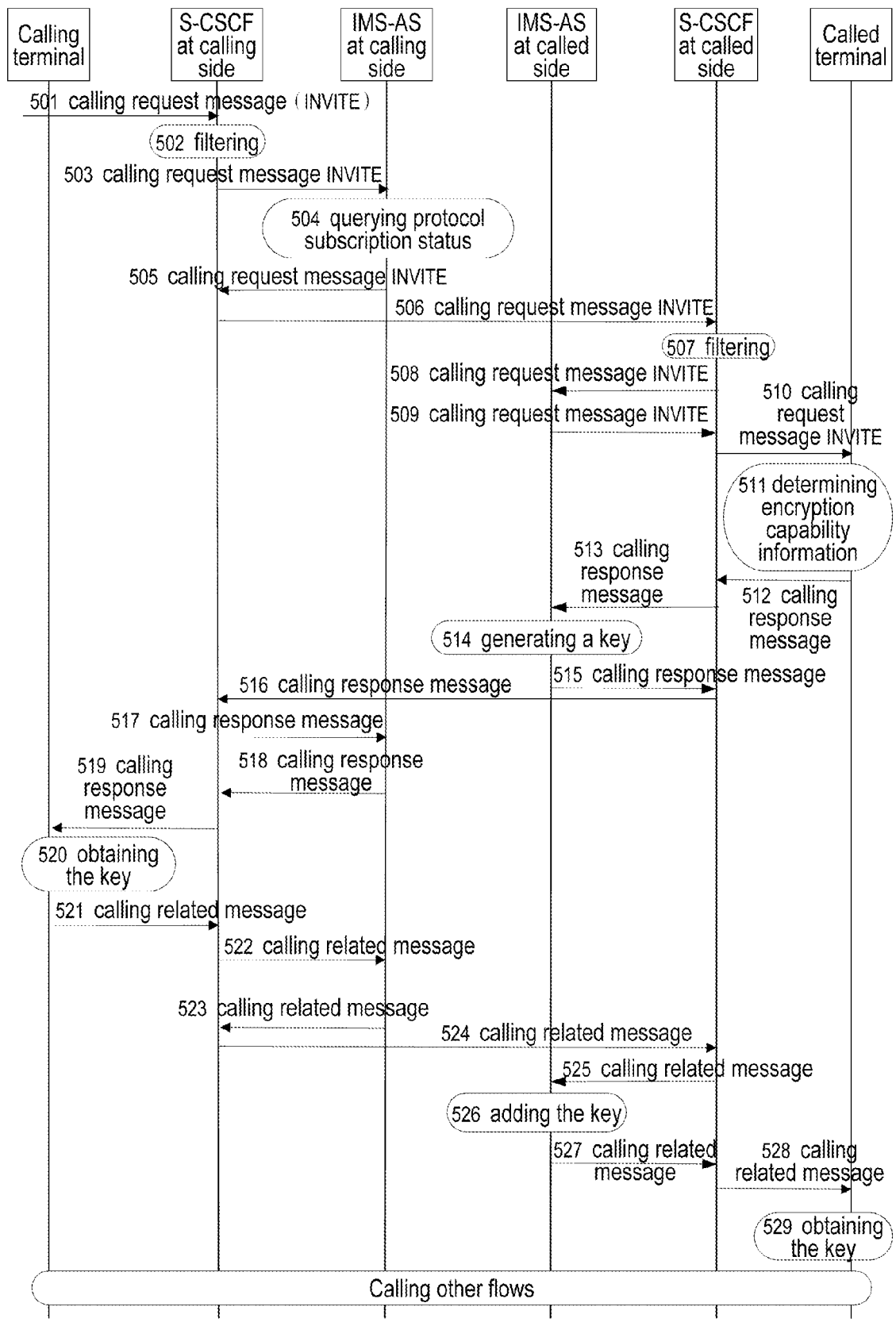
FIG. 5 is a schematic diagram of the message flow according to embodiment five of the present disclosure.

FIG. 5 is a schematic diagram of the message flow according to this embodiment. As illustrated in FIG. 5, the embodiment includes the following blocks:

Block 501~Block 503 are identical to Block 201~Block 203 in embodiment 2, so that related descriptions are omitted for brevity.

Block 504~Block 506: The IMS-AS at the calling side queries preset encryption service subscription information, and determines that the calling terminal has not subscribed based on the user identifier and a key distribution protocol has been subscribed between the domain to which the calling terminal belongs and the domain to which the called terminal belongs, and then the IMS-AS transmits a calling request message to the S-CSCF at the called side via the S-CSCF at the calling side.

Similar to embodiment 2, if the calling request message carries a security precondition that contains an end-to-end encryption identifier, the IMS-AS at the calling side may then determine that this is a calling request message that requires end-to-end encryption based on the calling request. As the calling terminal has not subscribed, the calling side does not generate a key for the calling terminal. In order to notify the called side of such status, the IMS-AS at the calling side may add an identifier indicating that the key is generated at the calling side into the calling request message.

Block 507~Block 510 are similar to Block 207~Block 210 in embodiment 2, except that upon the receipt of the calling request message, the IMS-AS at the called side queries preset encryption service subscription information, and determines that the called terminal has subscribed based on the user identifier.

Surely, if the calling request message further comprises information, such as security precondition, the IMS-AS at the calling side may determine that the encryption manner is end-to-end encryption based on the calling request message, and then the key is generated by the security application server at the called side.

In practice, if the IMS-AS at the called side determines that the called terminal has not subscribed the encryption service, the IMS-AS may delete itself from the link and add an identifier that no key is generated into the message. Hereafter, when the IMS-AS at the calling side obtains the identifier from the calling response message, the IMS-AS at the calling side may delete itself from the signaling link as well.

Block 511~Block 513: The called terminal determines encryption capability information for generating a key according to the encryption capability information of the calling terminal and the called terminal itself, and then returns to the IMS-AS at the called side a calling response message that carries the encryption capability information for generating a key.

Block 514: The IMS-AS at the called side generates a key based on the encryption capability information in the calling response message, and adds the generated key into the calling response message.

Block 515~Block 520 are similar to Block 214~Block 220 in embodiment 2, except that upon receipt of the calling response message, the IMS-AS at the calling side no longer generates a key, but forwards it out directly.

Block 521~Block 529 are similar to Block 221~Block 229 in embodiment 2, except that upon receipt of the calling related message, the IMS-AS at the calling side does not add the key into the calling related message, and in the subsequent process, the called side adds the key into the calling related message to transmit to the called terminal.

Method Embodiment 6

In the method embodiment 6, the calling request message initiated by the calling terminal does not carry encryption capability information, i.e., not requiring an encryption. In practice, the terminal may provide users with options such as "encrypt", "not encryption", "auto-negotiate whether to encryption or not", etc. The terminal decides whether to generate a calling request message that carries an encryption statement in accordance with a selection from the users.

In this embodiment, the called side regards the encryption service as a value-added service, and the called terminal has subscribed the encryption service. In this embodiment, the security application server is a functional unit in the S-CSCF. For brevity, the security application server will not be illustrated by itself in the figures.

Figure 6:
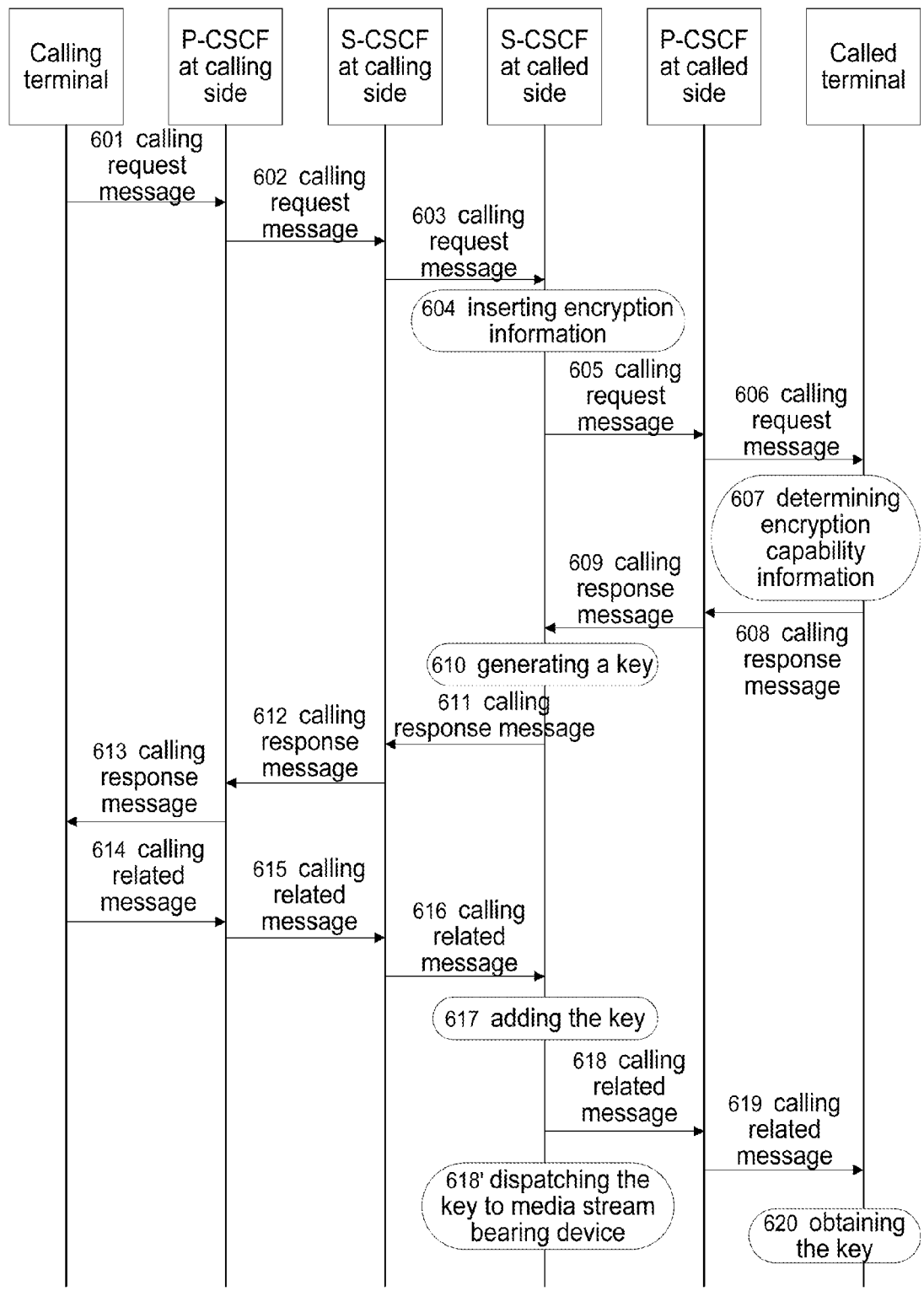
FIG. 6 is a schematic diagram of the message flow according to embodiment six of the present disclosure.

FIG. 6 is a schematic diagram of the message flow according to the embodiment. As illustrated in FIG. 6, the embodiment includes the following blocks:

Block 601~Block 603: The calling terminal transmits a calling request message to the S-CSCF at the calling side, which directly forwards this message to the S-CSCF at the called side;

Block 604~Block 606: The S-CSCF at the called side adds encryption capability information into the calling request message, and then forwards the message to the called terminal.

Block 607: The called terminal determines encryption capability information for generating a key on the basis of the encryption capability information in the calling request message and the encryption capability information of its own, and adds the determined encryption capability information for generating a key to a calling response message.

Block 608~Block 610: The called terminal returns the calling request message to the S-CSCF at the called side, and the security application unit in the S-CSCF at the called side generates a key based on the encryption capability information in the calling response message.

Block 611~Block 613: The S-CSCF at the called side continues returning the calling response message to the calling terminal.

In practice, the S-CSCF at the called side may also delete the encryption capability information added previously, and returns an ordinary calling response message to the calling terminal.

Block 614~Block 620: The calling terminal transmits a calling related message to the called terminal; in the process of the transmission, the S-CSCF at the called side adds the generated key into the calling related message to transmit it to the called terminal, and send it to media stream bearing devices.

Hereafter, as only the media stream bearing devices at the called side and the called terminal obtain the key, the media stream is transmitted in encryption at the called terminal and the media stream bearing devices at the called side, but in plaintext at the calling side.

Above method embodiments 2-6 explained how to generate and distribute a key in terms of a single security application server or a functional module in a certain entity, respectively. In practice, the security management server is neither limited to an application server such as IMS-AS, nor limited to a functional module in S-CSCF, as long as it may generate a key based on encryption capability information of terminals and distribute the generated key.

Directing to the method of the disclosure, the disclosure further provides a system for distributing key of media stream.

Figure 7:
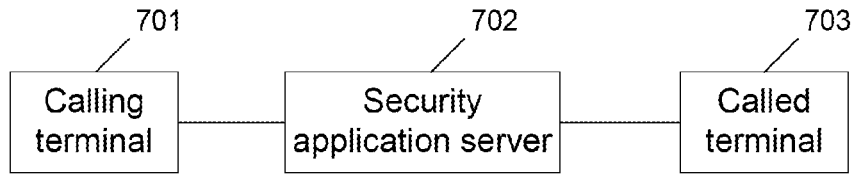
FIG. 7 is a schematic diagram of a basic structure of a system according to the embodiment one of the present disclosure.

FIG. 7 is a schematic diagram of a basic structure of embodiment 1 of a system for distributing key of media stream according to embodiments of the present disclosure. The system includes a calling terminal 701, a security application server 702, a called terminal 703, in which the security application server 702 determines an encryption manner based on subscription status of a domain to which the calling terminal belongs and a domain to which the called terminal belongs, generates a key based on encryption capability information obtained in a calling process, and transmits the generated key to the calling terminal and/or the called terminal.

The security application server 702 in the disclosure may be IMS-AS, a functional module of CSCF, or a third party server. For practical application, other type of server or functional module in some entity may be utilized to replace the security application server in this embodiment, as long as it may generate a key based on encryption capability information of terminals and distribute the key to the terminals. Regardless of types, they may be called a security management server.

Terminal CSCF~Method Embodiment 5

Figure 8:
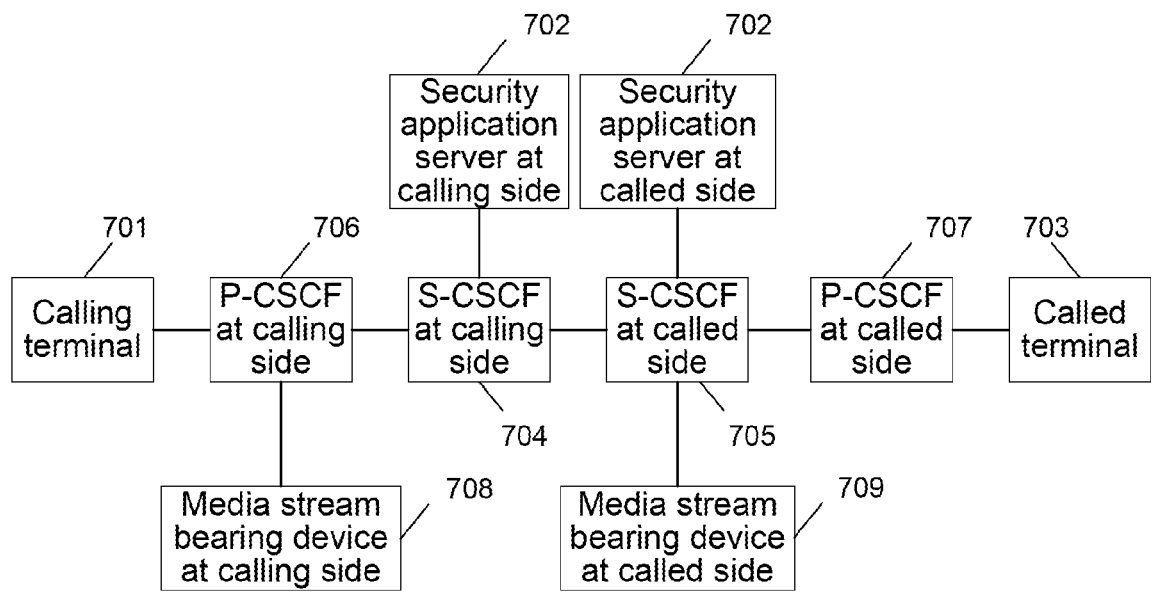
FIG. 8 is a schematic diagram of a basic structure of a system according to the embodiment two of the present disclosure.

FIG. 8 is a schematic diagram of a basic structure of embodiment 2 of a system according to the disclosure. As illustrated in FIG. 8, the security application server 702 may be a security application server at the calling side and a security application server at the called side, as the calling process is in relation to the calling side and the called side simultaneously. This embodiment further comprises: a calling terminal 701, an S-CSCF at the calling side 704, an S-CSCF at the called side 705 and a called terminal 703.

The calling terminal 701 is configured to initiate the calling, and obtain from a calling flow a key returned by the security application server at the calling side or the security application server at the called side.

The security application server 702 generates a key and transmits the key to terminals.

The S-CSCF 704 at the calling side and the S-CSCF 705 at the called side forward messages in the calling flow, and transmit a calling request message that carries encryption capability information to a corresponding security application server.

In practice, the system further comprises a P-CSCF 706 at the calling side, a P-CSCF 707 at the called side, a media stream bearing device 708 at the calling side and a media stream bearing device 709 at the called side.

The P-CSCF 706 at the calling side is configured to forward calling messages, and transmit obtained key to the media stream bearing device 708 at the calling side, while the P-CSCF 707 at the called side is configured to forward calling messages, and transmit obtained key to the media stream bearing device 709 at the called side.

In practical application, the security application server 792 may be IMS-AS, a functional module in S-CSCF, a functional module in P-CSCF, or a third party server, as long as it may generate a key based on encryption capability information of terminals and distribute the generated key.

FIG. 8, of course, merely demonstrates a basic structure of a system. Function of each of the entities associates with the manner for the terminals to obtain a key. Please see above descriptions in regard to method embodiments, which are omitted here for brevity.

The disclosure is explained with an IMS network in which signaling links may guarantee security as an example. In practice, the method of the embodiments of the disclosure is applicable to other type of networks, e.g., soft-switch-based next generation network etc., methods of which are similar to the disclosure, so that they will not be described in detail here.

By applying the solution of the embodiments of the disclosure, the calling terminal and the called terminal per se do not generate a key, which instead is generated by a security application server without clock synchronization and support from PKI architecture, so that the complexity for media stream key negotiation may be reduced to promote media stream encryption services. Moreover, when end-to-end encryption is adopted, a key may be obtained from a security application server, in order to meet demands for lawful interception; when segmented encryption is adopted, the demands for lawful interception may be met as well, as a plaintext transmission is used between a media stream bearing device at the calling side and a media stream bearing device at the called side.

In summary, those described above are preferred embodiments of the disclosure, but the protection scope of the disclosure will not be limited therein. Those skilled in the art may easily contemplate variations or substitutes within the disclosure of the disclosure, which shall be covered in the protection scope of the disclosure. Thus, the protection scope of the disclosure shall be defined by claims.

What is claimed is:

1. A method for distributing a key of a media stream, wherein a calling terminal initiates a call, the method comprising:
   determining, by a security management server, based on a calling request message, whether a domain to which the calling terminal belongs and a domain to which a called terminal belongs subscribe a key distribution protocol; and
   if the key distribution protocol has been subscribed, generating, by the security management server, a key based on encryption capability information obtained in a calling process, and distributing the generated key to the calling terminal and the called terminal;
   when the key distribution protocol has not been subscribed, generating, by the security management server, a key based on encryption capability information obtained in a calling process, and distributing the generated key to the terminal at the same domain as the security management server.

2. The method of claim 1, wherein the security management server generating a key based on encryption capability information obtained in a calling process, and distributing the same generated key to the calling terminal and the called terminal is a security management server at the calling side, and the security management server generating a key based on encryption capability information obtained in a calling process, and distributing the same generated key to the calling terminal and the called terminal comprises:
   receiving, by the called terminal from the calling terminal, the calling request message that carries encryption capability information of the calling terminal;
   determining, by the called terminal, encryption capability for generating a key based on encryption capability information of the calling terminal and encryption capability information of the called terminal;
   returning a calling response message that carries the encryption capability for generating a key;
   generating, by a security application server at the calling side, a key based on the encryption capability information in the calling response message;
   transmitting the generated key to the calling terminal;
   transmitting, by the calling terminal, a calling related message to the called terminal;
   adding, by the security application server at the calling side, the key into the calling related message; and
   transmitting the calling related message to the called terminal.

3. The method of claim 2, wherein the calling request message carries an end-to-end encryption identifier, and the method further comprises:
   adding, by the security application server at the calling side, an identifier indicating that the key is generated at the calling side into the calling request message;
   determining, based on the calling request message, by the security application server at the called side, that an encryption manner is an end-to-end encryption; and
   determining that the key is generated by the security application server at the calling side.

4. The method of claim 1, wherein the security management server is a security application server at the calling side and a security application server at the called side, and the security management server generating a key based on encryption capability information obtained in a calling process, and distributing the generated key to the terminal at the same side as the security management server comprises:
   recording, by the security application server at the calling side, the encryption capability information of the calling terminal in the calling request message from the calling terminal;
   returning, by the called terminal, a calling response message that carries the encryption capability information of the called terminal, upon receipt of the calling request;
   obtaining and recording, by the security application server at the called side, the encryption capability information of the called terminal from the calling response message;
   transmitting, by the security application server at the calling side to the calling terminal, a key generated based on the encryption capability information of the calling terminal;
   sending the key to a media stream bearing device at the calling side;
   transmitting, by the security application server at the called side, a key generated based on the encryption capability information of the called terminal to the called terminal; and sending the key to a media stream bearing device at the called side.

5. The method of claim 4, wherein the media stream bearing device is a media proxy (MP), and the security application server at the calling side transmitting to the calling terminal a key generated based on the encryption capability information of the calling terminal and sending the first key to a media stream bearing device at the calling side comprises:
   transmitting, by the security application server at the calling side, the generated key to the MP at the calling side through a Calling Session Control Function (CSCF) at the calling side; and
   the security application server at the called side transmitting the key to a media stream bearing device at the called side comprises:
   transmitting, by the security application server at the called side, the generated key to the MP at the called side through the CSCF at the called side.

6. The method of claim 4, wherein prior to receipt of the calling request by the called terminal, the method further comprises:
   querying, by the security application server at the called side, preset encryption service subscription information to determine whether the called terminal has subscribed based on a user identifier; and
   if the called terminal has subscribed, proceeding with the process; and
   if the called terminal has not subscribed executing the process which comprises:
   when the called terminal returns the calling response message transmitting, to the calling terminal by the security application server at calling side, the key generated based on the encryption capability information of the calling terminal; and
   sending the encryption capability information to the media stream bearing device at the calling side.

7. The method of claim 4, wherein
   the calling request message carries an end-to-end encryption identifier, and the method further comprises:
   modifying, by the security application server at calling side, the end-to-end encryption identifier to a segmented encryption identifier;
   determining, by the security application server at the called side based on the calling request message, the encryption manner to be used in the segmented encryption.

8. The method of claim 7, wherein the calling response message carries the segmented encryption identifier, and the method further comprises:
   restoring, by the security application server at calling side, the segmented encryption identifier to the end-to-end encryption identifier.

9. The method of claim 1, wherein the security management server is the security application server at the calling side and the security application server at the called side, and the method further comprises:
   querying, by the security application server at the calling side, preset encryption service subscription information to determine whether the calling terminal has subscribed based on the user identifier;
   if the calling terminal has subscribed, proceeding with the process; and
   if the calling terminal has not subscribed, executing the process which comprises:
   receiving, by the called terminal from the calling terminal, a calling request message that carries the encryption capability information of the calling terminal;
   determining, by the called terminal, encryption capability information for generating a key based on the encryption capability information of the calling terminal and the encryption capability information of the called terminal;
   returning a calling response message that carries the encryption capability information for generating the key;
   generating, by the security application server at the called side, the key based on the encryption capability information in the calling response message;
   transmitting the generated key to the calling terminal;
   returning, by the calling terminal, a calling related message to the called terminal; and
   transmitting, by the security application server at the called side, the generated key to the called terminal through the calling related message.

10. The method of claim 9, further comprising:
    determining, by the security application server at calling side based on the calling request message, that the domain to which the calling terminal belongs and the domain to which the called terminal belongs subscribe a key distribution protocol.

11. The method of claim 9, wherein the calling request message carries the end-to-end encryption identifier, and the method further comprises:
    adding, by the security application server at calling side, the key identifier generated at the called side into the calling request message;
    determining, based on the calling request message, by the security application server at the called side, that the encryption manner is an end-to-end encryption; and
    generating, by the security application server at the called side, the key.

12. The method of claim 9, further comprising:
    querying, by the security application server at the called side, preset encryption service subscription information, and
    determining, based on the user identifier, that the called terminal has subscribed.

13. The method of claim 9, further comprising:
    determining, by the security application server at calling side, whether the calling request message comprises the encryption capability information;
    if the calling request message comprises the encryption capability information, proceeding with the process; and
    if the calling request message does not comprise the encryption capability information, executing the process which comprises:
    returning, by the called terminal, a calling response message that carries encryption capability information upon receipt of the calling request message;
    obtaining and recording, by the security application server at the called side, encryption capability information of the called terminal from the calling response message; and
    transmitting, by the calling terminal, a calling related message to the called terminal upon receipt of the calling response message;
    wherein, during the transmitting, the security application server at the called side transmits to the called terminal through the calling related message, a key generated from the encryption capability information and sends the key to the media stream bearing devices at the called side.

14. The method of claim 13, further comprising:
adding, by the security application server at the called side, the encryption capability information into the calling request message;
determining, by the called terminal, the encryption capability information for generating the key based on the encryption capability information in the calling request message and the encryption capability information of the called terminal itself; and
adding the determined encryption capability information for generating the key into the calling response message.

15. The method of claim 13, further comprising:
querying, by the security application server at the called side, preset encryption service subscription information, and
determining, based on the user identifier, that the called terminal has subscribed.

16. The method of claim 1, wherein when the exchange between the calling terminal and the called terminal in the calling flow comprises a status identifier for obtaining a key, the method further comprises:
if the calling terminal or the called terminal has not obtained the key, setting the status identifier in the messages transmitted to the called terminal or the calling terminal to be a key-not-obtained identifier; and
if the calling terminal or the called terminal has obtained the key, setting the status identifier in the messages transmitted to the called terminal or the calling terminal to be a key-obtained identifier.

\* \* \* \* \*